US009208065B1

(12) United States Patent
Ekambaram et al.

(10) Patent No.: US 9,208,065 B1
(45) Date of Patent: Dec. 8, 2015

(54) CORRELATING OUT-OF-BAND PROCESS DATA DURING MOBILE TEST AUTOMATION

(71) Applicant: International Business Machines Corporation, Armonk, NY (US)

(72) Inventors: Vijay Ekambaram, Chennai (IN); Vikrant Nandakumar, Bangalore (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/277,493

(22) Filed: May 14, 2014

(51) Int. Cl.
*G06F 9/44* (2006.01)
*G06F 11/00* (2006.01)
*G06F 11/36* (2006.01)

(52) U.S. Cl.
CPC ........ *G06F 11/3688* (2013.01); *G06F 11/3684* (2013.01); *G06F 11/3696* (2013.01)

(58) Field of Classification Search
CPC ............ G06F 11/3684; G06F 11/3688; G06F 11/3696
USPC .............................. 717/124–135; 714/37, 38.1
See application file for complete search history.

(56) References Cited

U.S. PATENT DOCUMENTS

| | | | |
|---|---|---|---|
| 7,398,469 B2 | 7/2008 | Kisamore et al. | |
| 8,196,118 B2 | 6/2012 | Vainer et al. | |
| 8,856,748 B1 * | 10/2014 | Larsen et al. | ............... 717/125 |
| 2003/0159089 A1 * | 8/2003 | DiJoseph | ...................... 714/38 |
| 2009/0328165 A1 * | 12/2009 | Cook et al. | ..................... 726/6 |
| 2010/0210293 A1 * | 8/2010 | Lim et al. | ..................... 455/466 |
| 2011/0320879 A1 | 12/2011 | Singh et al. | |
| 2012/0198279 A1 | 8/2012 | Schroeder | |
| 2012/0322470 A1 * | 12/2012 | Said et al. | ..................... 455/466 |
| 2013/0078983 A1 | 3/2013 | Doshi et al. | |
| 2013/0179858 A1 * | 7/2013 | Mecke et al. | ............... 717/106 |
| 2013/0196600 A1 * | 8/2013 | Capers et al. | ............... 455/41.2 |

OTHER PUBLICATIONS

Gomez, Lorenzo, et al., "Reran: Timing- and Touch-Sensitive Record and Replay for Android," Proceedings of the 2013 International Conference on Software Engineering (ICSE '13), May 18-26, 2013, pp. 72-81, San Francisco, CA, USA, ACM Digital Library.

Song, Hyungkeun, et al., "An Integrated Test Automation Framework for Testing on Heterogeneous Mobile Platforms," First ACIS International Symposium on Software and Network Engineering, Dec. 19-20, 2011, pp. 141-145, Seoul, Korea, IEEE Digital Library.

* cited by examiner

*Primary Examiner* — Qing Chen
(74) *Attorney, Agent, or Firm* — Ference & Associates LLC

(57) ABSTRACT

Methods and arrangements for testing mobile applications. A mobile application for testing is input at a mobile device. The mobile application is automatically tested using a test script, wherein the testing requires data from an out-of-band channel. The testing includes: invoking a listener module based on the mobile application; using the listener module to automatically obtain data from an out-of-band channel; and communicating the automatically obtained data to the mobile application. Other variants and embodiments are broadly contemplated herein.

15 Claims, 3 Drawing Sheets

CORRELATING OUT-OF-BAND PROCESS DATA DURING MOBILE TEST AUTOMATION

BACKGROUND

With the proliferation of available mobile phone applications (often referred to as "apps"), evolving needs have been recognized in connection with effectively testing or authenticating such applications.

Testing can involve authentication via out-of-band data correlation (wherein "data correlation" makes use of data returned in response to a previous test step). Here, "out-of-band" refers to communications which occur outside of a previously established communication method or channel, and related authentication involves using two separate networks or channels simultaneously in communication to identify a user. One such network or channel will typically be something other than a primary network or channel.

Generally, many mobile applications include features which trigger an action outside the application itself. In banking applications, a one time password (OTP) can be sent as a text message (e.g., a SMS [short messaging service] text message) and involves user input or intervention to type the password into an appropriate field. Location-based applications, on the other hand, involve user input or intervention to enter information such as a zip code in order to present relevant results. Shopping applications can often involve the sending of promotion codes via email or SMS, and can be used during a checkout process.

The above examples are merely illustrative of mobile applications which involve processing out-of-band data and which warrant being tested (or authenticated) on an ongoing basis. However, conventional testing arrangements have proven to be cumbersome and inefficient, and thus are largely inadequate to accommodate the ever-growing range, number and sophistication of available mobile applications.

BRIEF SUMMARY

In summary, one aspect of the invention provides a method of testing a mobile application, said method comprising: utilizing at least one processor to execute computer code configured to perform the steps of: inputting, at a mobile device, a mobile application for testing; automatically testing the mobile application using a test script, wherein said testing requires data from an out-of-band channel; and said testing comprising: invoking a listener module based on the mobile application; using the listener module to automatically obtain data from an out-of-band channel; and communicating the automatically obtained data to the mobile application.

Another aspect of the invention provides an apparatus for testing a mobile application, said apparatus comprising: at least one processor; and a computer readable storage medium having computer readable program code embodied therewith and executable by the at least one processor, the computer readable program code comprising: computer readable program code configured to input, at a mobile device, a mobile application for testing; computer readable program code configured to automatically test the mobile application using a test script, wherein the testing requires data from an out-of-band channel, the testing comprising: invoking a listener module based on the mobile application; using the listener module to automatically obtain data from an out-of-band channel; and communicating the automatically obtained data to the mobile application.

An additional aspect of the invention provides a computer program product for testing a mobile application, said computer program product comprising: a computer readable storage medium having computer readable program code embodied therewith, the computer readable program code comprising: computer readable program code configured to input, at a mobile device, a mobile application for testing; computer readable program code configured to automatically test the mobile application using a test script, wherein the testing requires data from an out-of-band channel, the testing comprising: invoking a listener module based on the mobile application; using the listener module to automatically obtain data from an out-of-band channel; and communicating the automatically obtained data to the mobile application.

A further aspect of the invention provides a method comprising: inputting a mobile application for testing; generating a test script; and testing the mobile application via employing the test script; the testing comprising automatically obtaining data from an out-of-band channel.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
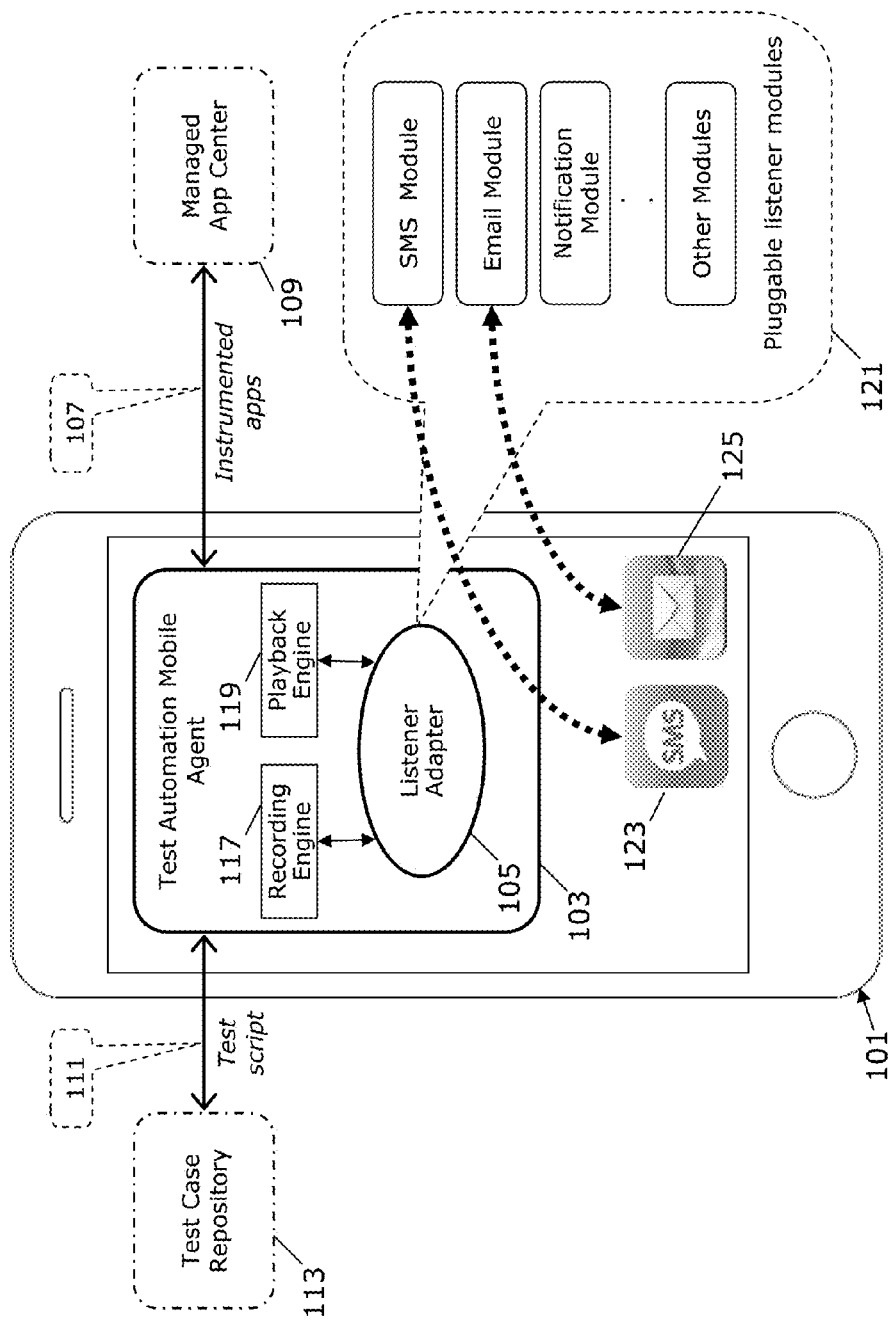
FIG. 1 schematically illustrates a mobile device with a test automation mobile agent, which itself includes a listener adapter for facilitating testing of applications.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIG. 1 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are methods and arrangements which permit correlation of out-of-band process data during mobile test automation via using listener adapters for automatic channel discovery and data extraction.

Generally, in conventional arrangements, testing of applications which use out-of-band processes normally requires significant user intervention. For instance, a social media application may send a confirmation code via an SMS message and require the user to reply with an SMS message.

By way of an illustrative example, for a conventional mobile phone application of a bank, the user may first enter his/her standard password for the application, and then be requested to generate an OTP. Here, the user may hit a button (on the mobile phone touchscreen), "Generate OTP", and an acknowledgement may then appear. The acknowledgement may instruct the user to check his/her mobile (e.g., SMS or email) inbox for an OTP PIN (personal identification number) or other password, and may also include an indication of the date and time (of the OTP generation) and a transaction ID. (To proceed, the user may then hit a "done" button on the mobile phone touchscreen.) The incoming confirmation message (e.g., SMS message) may then merely indicate the OTP in text along with a transaction ID, and the user will then be expected to re-enter (re-type) the OTP in another screen (e.g., in a text box with the label "OTP verification"). A verification screen may then appear in response, showing an acknowledgement that the OTP was verified successfully, along with the date and time of such verification and a transaction ID. The user may then proceed to one or more screens associated with the application itself, and even then may need to re-enter his/her standard password to perform a sensitive action such as making an account balance inquiry.

Generally, conventional mobile test automation tools are configured for, or bound to, merely a single AUT (application under test). Thus, any action which occurs outside of the scope of the application cannot be captured during testing, and a playback service will be unable to play that action back with the flow of the test script. Possible solutions involving manual entry of values during an automation run, using data pools with pre-defined values and/or using application stubs, involve significant disadvantages. Accordingly, there are broadly contemplated herein, in accordance with at least one embodiment of the invention, methods and arrangements for providing a mobile test automation system which facilitates correlation of out-of-band process data, effective test script creation and fully automated playback.

FIG. 1 schematically illustrates, in accordance with at least one embodiment of the invention, a mobile device (e.g., mobile phone, which may be a smartphone) 101 with a test automation mobile agent 103, itself including a listener adapter 105 for facilitating testing of applications. In accordance with the illustrated example, an instrumented AUT is obtained (107) from an application center 109, along with a test script (111) from a test case repository 113. The test script 111 is thus configured to be utilized to help undertake testing of the AUT. The test automation agent 103, installed on the mobile device 101, includes a recording engine 117 and playback engine 119. Thus, when an AUT is under test, as is known conventionally, the recording engine 117 records actions that take place via the mobile device 101 and the playback engine 119 plays back what is recorded.

In accordance with at least one embodiment of the invention, during a recording phase, if control is no longer within the AUT, a placeholder is created during test script generation and all interactions outside of the AUT remain invisible to the playback engine 119. The listener adapter 105 then automatically avails one or more pluggable custom listener modules 121 (e.g., an SMS module, an email module and/or a notification module), depending on the AUT at hand. These are in communication with applications or utilities already on the mobile device (e.g., an SMS application or utility 123 and/or an email application or utility 125). Thus, in the context of the illustrative example of a banking application discussed above, the listener adapter 105 can be invoked with a SMS module which listens for an incoming text message, reads its content and, in a manner to be understood more fully below, returns an appropriate value back to the playback service (119).

In accordance with at least one embodiment of the invention, since the grammar of text messages may vary for different AUTs, the listener adapter 105 can be configured to automatically detect syntactic structure and other pertinent data (e.g., sender details such as a phone number) and extract data as may be appropriate. Also, since the out-of-band authentication messages are system-generated, a test script need only be created once and executed any number of times and on any device where the particular AUT in question installed. Accordingly, data correlation is facilitated when extracted data (as noted above) can be used in steps subsequent to extraction.

In accordance with at least one embodiment of the invention, a listener adapter 105 may function as follows. When, during testing of an application, control is removed from the AUT, the UI (user interface) associated with the AUT, as last seen by the user, can be inspected to extract keywords to automatically identify the out-of-band channel. Using conventional text mining techniques (e.g., keyword spotting), detection of a relevant statement (e.g., "Please check your mobile inbox for OTP pin") can help the recording engine 117 infer that a particular type of listener module (e.g., an SMS listener module) needs to be established. A deeper automatic inspection of the screen then can reveal the details required by the SMS listener to parse the incoming text message (e.g., sender name and number).

At this point, in accordance with at least one embodiment of the invention, the recording engine 117 is able to assimilate (or has "visibility" to) the OTP entered by the user on the screen that follows. The OTP data then entered can be compared against the incoming confirmation text message to identify the appropriate token to be extracted during playback phase. This can be undertaken, e.g., via automatically identifying semantics from the incoming SMS or email message (e.g., by looking for a "fourth token", which may be understood to correspond to the OTP). These data can be stored and correlated in the test script during the mobile test automation process. Thus, the listener adapter 105 ensures through this process that details for out-of-band data correlation is included automatically without any manual input or intervention from the user.

Figure 2:
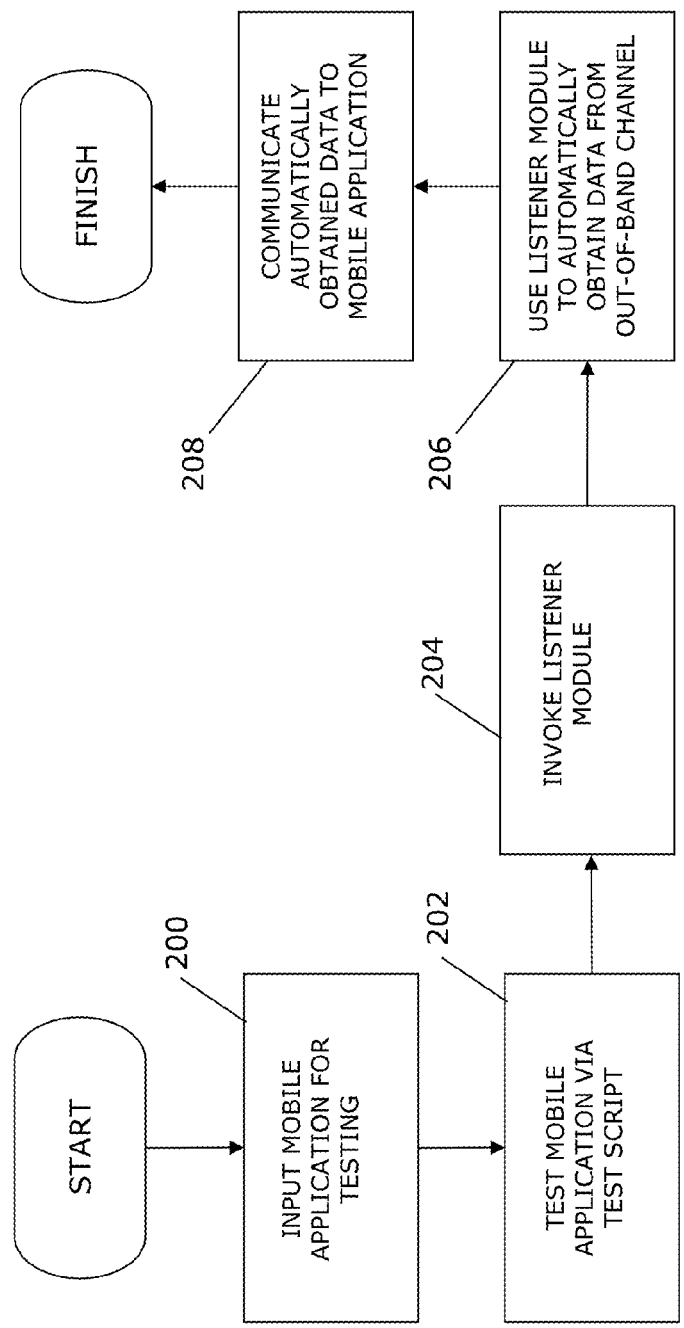
FIG. 2 sets forth a process more generally for testing mobile applications.

FIG. 2 sets forth a process more generally for testing mobile applications, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, a mobile application for testing is input at a mobile device (200). The mobile application is automatically tested using a test script, wherein the testing requires data from an out-of-band channel (202). The testing includes: invoking a listener module based on the mobile application (204); using the listener module to automatically obtain data from an out-of-band channel (206); and communicating the automatically obtained data to the mobile application (208).

Figure 3:
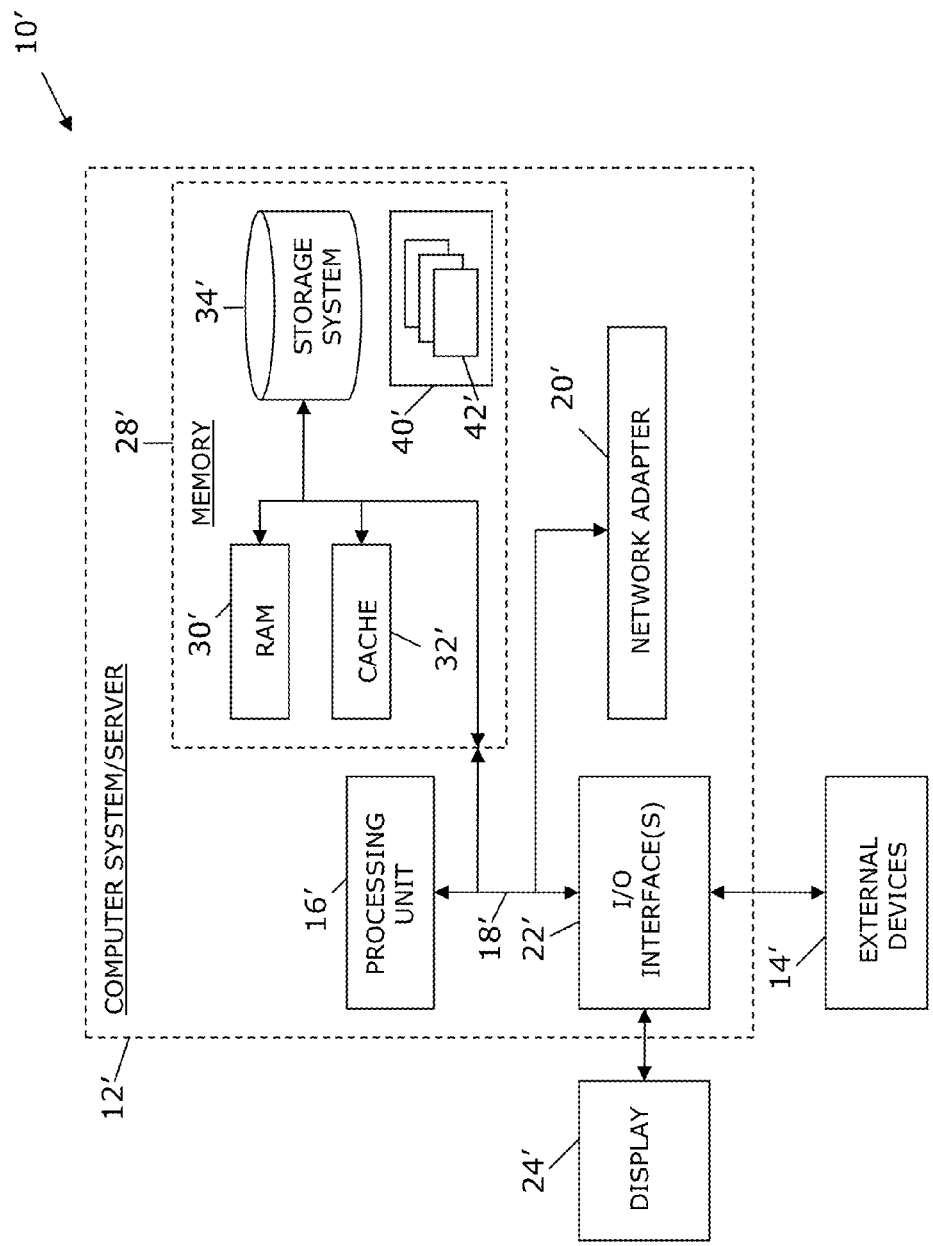
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of testing a mobile application, said method comprising:
utilizing at least one processor to execute computer code configured to perform the steps of:
inputting, at a mobile device, a mobile application for testing; and
automatically testing the mobile application using a test script, wherein said testing requires data from an out-of-band channel, and wherein said testing comprises:
generating the test script;
using a test automation agent to conduct a test via processing the test script, wherein the test automation agent includes a recording engine and a playback engine;
wherein said generating comprises creating a placeholder for the test script to render interactions in the out-of-band channel invisible to the playback engine;
invoking a listener module based on the mobile application, wherein the listener module is in communication with the recording engine and the playback engine;
wherein said invoking comprises automatically identifying the out-of-band channel via inspecting a user interface of the mobile device and extracting at least one keyword therefrom;
using the listener module to automatically obtain data from the out-of-band channel; and
communicating the automatically obtained data to the mobile application.

2. The method according to claim 1, wherein the listener module includes at least one of: an SMS module, an email module, and a notification module.

3. The method according to claim 2, wherein:
the listener module includes an SMS module; and
said invoking comprises listening for an incoming SMS message.

4. The method according to claim 3, wherein to automatically obtain data from the out-of-band channel comprises reading the incoming SMS message and providing data therefrom to the playback engine.

5. The method according to claim 1, wherein said inspecting comprises determining at least one detail required by the listener module to parse an incoming communication to the mobile device.

6. The method according to claim 5, further comprising:
using the recording engine to read a one-time password entered by a user; and
comparing the one-time password to the incoming communication to identify at least one token to be extracted during a playback phase.

7. The method according to claim 1, wherein the listener module comprises a pluggable listener module.

8. An apparatus for testing a mobile application, said apparatus comprising:
at least one processor; and
a computer readable storage medium having computer readable program code embodied therewith and executable by the at least one processor, the computer readable program code comprising:
computer readable program code configured to input, at a mobile device, a mobile application for testing; and
computer readable program code configured to automatically test the mobile application using a test script, wherein said testing requires data from an out-of-band channel, and wherein said testing comprises:
generating the test script;
using a test automation agent to conduct a test via processing the test script, wherein the test automation agent includes a recording engine and a playback engine;
wherein said generating comprises creating a placeholder for the test script to render interactions in the out-of-band channel invisible to the playback engine;
invoking a listener module based on the mobile application, wherein the listener module is in communication with the recording engine and the playback engine;
wherein said invoking comprises automatically identifying the out-of-band channel via inspecting a user interface of the mobile device and extracting at least one keyword therefrom;
using the listener module to automatically obtain data from the out-of-band channel; and
communicating the automatically obtained data to the mobile application.

9. A computer program product for testing a mobile application, said computer program product comprising:
a computer readable storage medium having computer readable program code embodied therewith, the computer readable program code comprising:
computer readable program code configured to input, at a mobile device, a mobile application for testing; and
computer readable program code configured to automatically test the mobile application using a test script, wherein said testing requires data from an out-of-band channel, and wherein said testing comprises:
generating the test script;
using a test automation agent to conduct a test via processing the test script, wherein the test automation agent includes a recording engine and a playback engine;
wherein said generating comprises creating a placeholder for the test script to render interactions in the out-of-band channel invisible to the playback engine;
invoking a listener module based on the mobile application, wherein the listener module is in communication with the recording engine and the playback engine;
wherein said invoking comprises automatically identifying the out-of-band channel via inspecting a user interface of the mobile device and extracting at least one keyword therefrom;
using the listener module to automatically obtain data from the out-of-band channel; and
communicating the automatically obtained data to the mobile application.

10. The computer program product according to claim 9, wherein the listener module includes at least one of: an SMS module, an email module, and a notification module.

11. The computer program product according to claim 10, wherein:
the listener module includes an SMS module; and
said invoking comprises listening for an incoming SMS message.

12. The computer program product according to claim 11, wherein to automatically obtain data from the out-of-band channel comprises reading the incoming SMS message and providing data therefrom to the playback engine.

13. The computer program product according to claim 9, wherein said inspecting comprises determining at least one detail required by the listener module to parse an incoming communication to the mobile device.

14. The computer program product according to claim 13, further comprising:
  computer readable program code configured to use the recording engine to read a one-time password entered by a user; and
  computer readable program code configured to compare the one-time password to the incoming communication to identify at least one token to be extracted during a playback phase.

15. A method of testing a mobile application, said method comprising:
  inputting, at a mobile device, a mobile application for testing;
  generating a test script; and
  testing the mobile application via employing the test script, wherein said testing comprises:
    using a test automation agent to conduct a test via processing the test script, wherein the test automation agent includes a recording engine and a playback engine;
    using a listener module to automatically obtain data from an out-of-band channel via:
      invoking the listener module based on the mobile application, wherein the listener module is in communication with the recording engine and the playback engine;
      wherein said invoking comprises automatically identifying the out-of-band channel via inspecting a user interface of the mobile device and extracting at least one keyword therefrom; and
      wherein said generating comprises creating a placeholder for the test script to render interactions in the out-of-band channel invisible to the playback engine; and
    communicating the automatically obtained data to the mobile application.

\* \* \* \* \*